(12) United States Patent
Sishtla et al.

(10) Patent No.: US 11,837,101 B2
(45) Date of Patent: Dec. 5, 2023

(54) SYSTEM AND METHOD TO DISPLAY AIRCRAFT RELATIVE STORM TOP IMAGE

(71) Applicant: Rockwell Collins, Inc., Cedar Rapids, IA (US)

(72) Inventors: Venkata A. Sishtla, Cedar Rapids, IA (US); Divesh Lakhi, Cedar Rapids, IA (US); Mark Fersdahl, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 176 days.

(21) Appl. No.: 17/398,700

(22) Filed: Aug. 10, 2021

(65) Prior Publication Data
US 2023/0050139 A1 Feb. 16, 2023

(51) Int. Cl.
*G08G 5/00* (2006.01)
*G01C 21/00* (2006.01)

(52) U.S. Cl.
CPC ....... *G08G 5/0091* (2013.01); *G01C 21/3867* (2020.08)

(58) Field of Classification Search
CPC . G08G 5/0091; G08G 5/0039; G01C 21/3867
See application file for complete search history.

(56) References Cited

U.S. PATENT DOCUMENTS

| | | | |
|---|---|---|---|
| 5,049,886 A | 9/1991 | Seitz et al. | |
| 5,059,967 A * | 10/1991 | Roos | G01S 7/22 342/26 B |
| 6,828,922 B1 * | 12/2004 | Gremmert | G01S 7/003 342/26 B |
| 6,879,280 B1 | 4/2005 | Bull et al. | |
| 7,109,912 B1 | 9/2006 | Paramore et al. | |
| 7,109,913 B1 | 9/2006 | Paramore et al. | |
| 7,492,305 B1 | 2/2009 | Woodell et al. | |
| 8,902,100 B1 | 12/2014 | Woodell et al. | |
| 8,994,578 B1 | 3/2015 | Finley et al. | |
| 9,019,147 B1 | 4/2015 | Oranskiy et al. | |
| 9,057,773 B1 | 6/2015 | Fersdahl et al. | |
| 9,244,167 B1 | 1/2016 | Oransky et al. | |
| 9,625,577 B1 * | 4/2017 | Finley | G08G 5/0091 |
| 9,652,888 B1 * | 5/2017 | Johnson | G01C 21/00 |
| 9,710,218 B2 | 7/2017 | Khatwa et al. | |

(Continued)

OTHER PUBLICATIONS

Extended European Search Report in European Application No. 22189667.3 dated Nov. 23, 2022, 8 pages.

*Primary Examiner* — Andrew W Bee
(74) *Attorney, Agent, or Firm* — Suiter Swantz pc llo (57) ABSTRACT

A system may include a display and a processor. The processor may be configured to: obtain aircraft data associated with an aircraft; obtain or generate storm top data, the storm top data including information associated with storm top altitudes and storm top locations; generate aircraft relative storm top data; generate an aircraft relative storm top image based at least on the aircraft relative storm top data, wherein the aircraft relative storm top image depicts a view of weather in front of the aircraft, wherein the aircraft relative storm top image conveys information associated with a difference between at least some of the storm top altitudes and an altitude of the aircraft; and output the aircraft relative storm top image as graphical data.

16 Claims, 7 Drawing Sheets

(56) References Cited

U.S. PATENT DOCUMENTS

| | | |
|---|---|---|
| 9,978,168 B1* | 5/2018 | Finley .................. G08G 5/0091 |
| 10,247,821 B1 | 4/2019 | Stover et al. |
| 2010/0194628 A1 | 8/2010 | Christianson et al. |
| 2016/0011741 A1* | 1/2016 | Khatwa ..................... G01S 7/22 |
| | | 715/765 |
| 2017/0082745 A1* | 3/2017 | Kronfeld ............... G01S 13/953 |
| 2017/0243496 A1 | 8/2017 | McCann et al. |
| 2018/0074167 A1 | 3/2018 | Bilek et al. |

* cited by examiner

702 — OBTAINING, BY AT LEAST ONE PROCESSOR, AIRCRAFT DATA ASSOCIATED WITH AN AIRCRAFT, THE AT LEAST ONE PROCESSOR COMMUNICATIVELY COUPLED TO A DISPLAY

704 — OBTAINING OR GENERATING, BY THE AT LEAST ONE PROCESSOR, STORM TOP DATA, THE STORM TOP DATA INCLUDING INFORMATION ASSOCIATED WITH STORM TOP ALTITUDES AND STORM TOP LOCATIONS

706 — GENERATING, BY THE AT LEAST ONE PROCESSOR, AIRCRAFT RELATIVE STORM TOP DATA BASED AT LEAST ON A DIFFERENCE BETWEEN EACH OF THE STORM TOP ALTITUDES AND AN ALTITUDE OF THE AIRCRAFT

708 — GENERATING, BY THE AT LEAST ONE PROCESSOR, AN AIRCRAFT RELATIVE STORM TOP IMAGE BASED AT LEAST ON THE AIRCRAFT RELATIVE STORM TOP DATA, WHEREIN THE AIRCRAFT RELATIVE STORM TOP IMAGE DEPICTS A VIEW OF WEATHER IN FRONT OF THE AIRCRAFT ACROSS A RANGE OF SCAN ANGLES, WHEREIN THE AIRCRAFT RELATIVE STORM TOP IMAGE CONVEYS INFORMATION ASSOCIATED WITH THE DIFFERENCE BETWEEN AT LEAST SOME OF THE STORM TOP ALTITUDES AND THE ALTITUDE OF THE AIRCRAFT

710 — OUTPUTTING, BY THE AT LEAST ONE PROCESSOR, THE AIRCRAFT RELATIVE STORM TOP IMAGE AS GRAPHICAL DATA

712 — DISPLAYING, BY THE DISPLAY, THE AIRCRAFT RELATIVE STORM TOP IMAGE TO A USER

FIG.7

SYSTEM AND METHOD TO DISPLAY AIRCRAFT RELATIVE STORM TOP IMAGE

BACKGROUND

Currently, most aircraft (e.g., single-aisle aircraft and larger aircraft) in the commercial aviation market lack vertical situational displays (VSDs) for displaying graphical vertical weather information and/or would require expensive software and/or hardware updates to support displaying graphical vertical weather information. Currently, pilots of such aircraft lack a means to analyze a vertical profile of a storm to gain better situational awareness and improve safety. Some long-range commercial aircraft have equipment that provides vertical weather information; however, current solutions require expensive software and/or hardware updates, and most commercial aircraft lack such expensive solutions.

SUMMARY

In one aspect, embodiments of the inventive concepts disclosed herein are directed to a system. The system may include at least one display and at least one processor. The at least one processor may be communicatively coupled to the at least one display. The at least one processor may be configured to: obtain aircraft data associated with an aircraft; obtain or generate storm top data, the storm top data including information associated with storm top altitudes and storm top locations; generate aircraft relative storm top data based at least on a difference between each of the storm top altitudes and an altitude of the aircraft; generate an aircraft relative storm top image based at least on the aircraft relative storm top data, wherein the aircraft relative storm top image depicts a view of weather in front of the aircraft across a range of scan angles, wherein the aircraft relative storm top image conveys information associated with the difference between at least some of the storm top altitudes and the altitude of the aircraft; and output the aircraft relative storm top image as graphical data. The at least one display may be configured to display the aircraft relative storm top image to a user.

In a further aspect, embodiments of the inventive concepts disclosed herein are directed to a method. The method may include: obtaining, by at least one processor, aircraft data associated with an aircraft, the at least one processor communicatively coupled to a display; obtaining or generating, by the at least one processor, storm top data, the storm top data including information associated with storm top altitudes and storm top locations; generating, by the at least one processor, aircraft relative storm top data based at least on a difference between each of the storm top altitudes and an altitude of the aircraft; generating, by the at least one processor, an aircraft relative storm top image based at least on the aircraft relative storm top data, wherein the aircraft relative storm top image depicts a view of weather in front of the aircraft across a range of scan angles, wherein the aircraft relative storm top image conveys information associated with the difference between at least some of the storm top altitudes and the altitude of the aircraft; outputting, by the at least one processor, the aircraft relative storm top image as graphical data; and displaying, by the display, the aircraft relative storm top image to a user.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system (e.g., an aircraft system) and a method configured to generate and/or display an aircraft relative storm top image(s). For example, the aircraft relative storm top image(s) may depict a view of weather in front of an aircraft across a range of scan angles. The aircraft relative storm top image(s) may convey information associated with a difference between storm top altitudes and an altitude of the aircraft.

Some embodiments may include a display configured to display relative storm top weather. Some embodiments may provide vertical weather information without a need to update display hardware and/or software. Some embodiments may generate and display a two-dimensional (2D) map (e.g., having an overhead view) of a storm tops with respect to an aircraft altitude to a user (e.g., a pilot). For example, a radar computing device may compute a storm top relative to the aircraft altitude and color code (e.g., as red, yellow, green, and/or white) such computed information based on a relevance (e.g., a threat level) to the aircraft altitude. For example, red may be used to show storm tops close to the aircraft altitude (e.g., a higher threat) and green for tops well below the aircraft altitude (e.g., lower threat). Some embodiments may allow a user (e.g., a pilot and/or the flight crew) to analyze an entire scan area using just one display, as compared to existing implementations that only display a scan area for a single azimuth on a dedicated vertical situational display (VSD).

Some embodiments enable cost effectively providing aircraft relative storm top image(s) on existing equipment in single-aisle aircraft, which currently lack expensive dedicated VSDs. Additionally, providing aircraft relative storm top image(s) may improve a pilot's situational awareness and the pilot's ability to safely navigate the aircraft. In some embodiments, providing aircraft relative storm top image(s) can be implemented in both retrofit and forward-fit options on any aircraft, without a need for expensive hardware and/or software updates.

Figure 1:
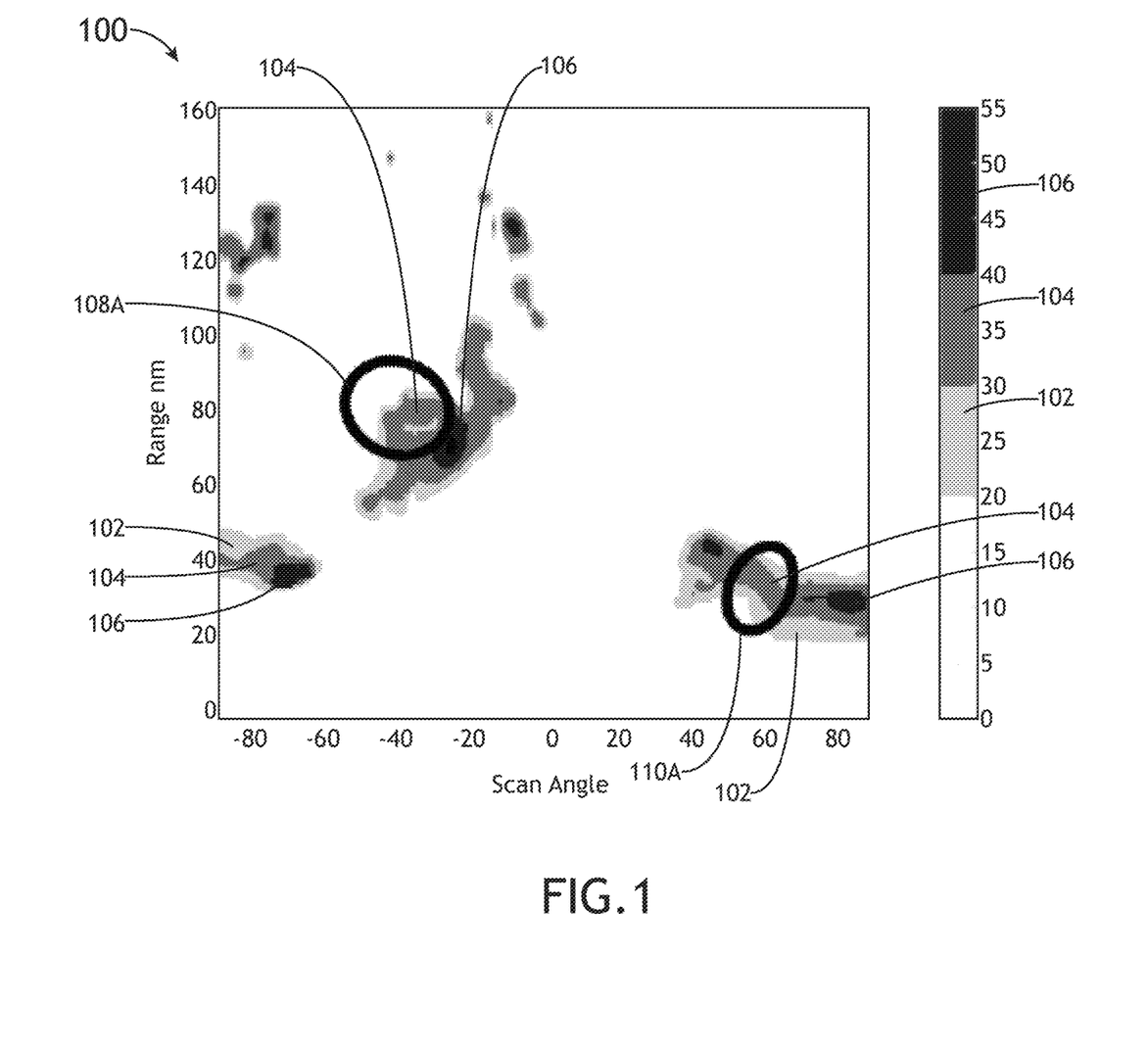
FIG. 1 is a view of an exemplary embodiment of a weather display image according to the inventive concepts disclosed herein.
Figure 2:
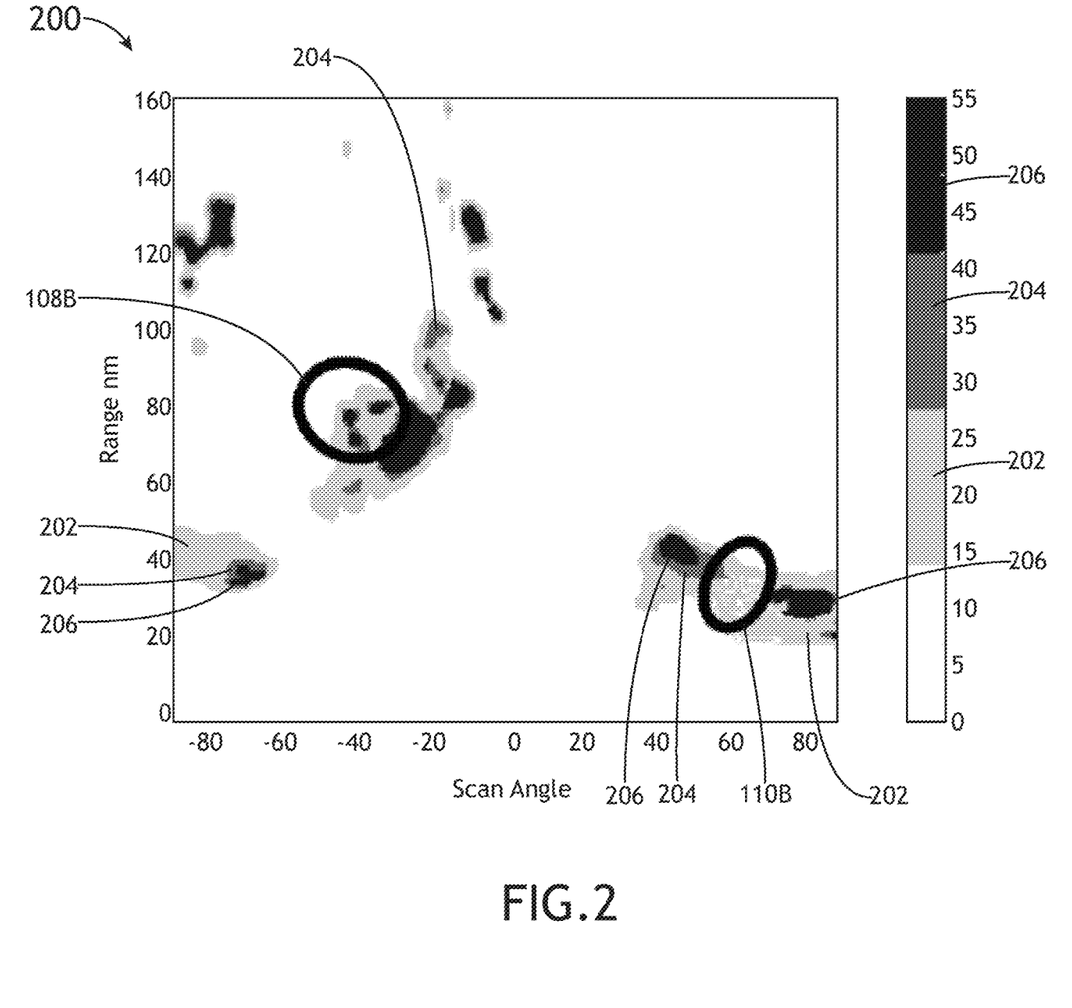
FIG. 2 is a view of an exemplary embodiment of an aircraft relative storm top image according to the inventive concepts disclosed herein.

Referring generally to FIGS. 1-2, exemplary embodiments of a view of an exemplary weather radar display image 100 and a view of an exemplary aircraft relative storm top image 200 are shown. For example, each of the weather radar display image 100 and a view of an exemplary aircraft relative storm top image 200 may convey a range (e.g., in nautical miles (nm)) dimension and a weather radar scan angle dimension. For example, a display may be configured to switch between displaying the weather radar display image(s) 100 and the aircraft relative storm top image(s) 200 based on a user input (e.g., a weather radar mode selection) to display either or both of the weather radar display image(s) 100 or the aircraft relative storm top image(s) 200.

Referring now to FIG. 1, an exemplary embodiment of a view of a weather radar display image 100 (e.g., a traditional overhead horizontal two-dimensional weather radar display image) depicting weather storms depicted by threat level (e.g., low threat 102, moderate threat level 104, and/or high threat level 106) of the weather storms, is shown. For example, the threat level (e.g., low threat 102, moderate threat level 104, and/or high threat level 106) may be color coded. For example, the low threat 102 may be shown as green, the moderate threat level 104 may be shown as yellow, and/or the high threat level 106 may be shown as red. As shown in FIG. 1, the weather radar display image 100 lacks storm top information of weather cells. Two areas of interest 108A, 110A of the weather radar display image 100 are exemplarily identified for illustrative purposes. If a user (e.g., a pilot) only relied the weather radar display image 100 navigating safely around storm cells, the pilot may perceive that it is safe to fly through the two areas of interest 108A, 110A; however, the weather radar display image 100 lacks storm top information of weather cells at the two areas of interest 108A, 110A.

Referring now to FIG. 2, an exemplary embodiment of a view of an aircraft relative storm top image 200 (e.g., an overhead horizontal two-dimensional aircraft relative storm top image) depicting weather storms depicted by threat level (e.g., low threat 202, moderate threat level 204, and/or high threat level 206) of the weather storms, is shown. For example, the aircraft relative storm top image 200 may depict a view of weather in front of an aircraft across a range of scan angles. The aircraft relative storm top image may convey information associated with a difference between at least some of the storm top altitudes and the altitude of the aircraft. For example, storm top information relative to the aircraft altitude may provide vertical situational awareness to a user (e.g., a pilot and/or flight crew), which may help the pilot and/or flight crew navigate through storms safely and with better fuel efficiency.

For example, predetermined threat levels (e.g., low threat 202, moderate threat level 204, and/or high threat level 206) may be color coded. For example, the low threat 202 may be shown as green, the moderate threat level 204 may be shown as yellow, and/or the high threat level 206 may be shown as red. For example, the high threat level 206 may include storm tops having storm top altitudes within 6,000 vertical feet of the altitude of the aircraft. For example, the moderate threat level 204 may include storm tops having storm top altitudes within between 6,000-10,000 vertical feet of the altitude of the aircraft. For example, the low threat level 202 may include storm tops having storm top altitudes more than 10,000 vertical feet below the altitude of the aircraft.

Two areas of interest 108B, 110B of the aircraft relative storm top image 200 are exemplarily identified for illustrative purposes. If the flight crew had to select a flight path between examples shown in the areas of interest 108A, 110A of the weather radar display image 100 of FIG. 1 and in the areas of interest 108B, 110B of the aircraft relative storm top image 200 of FIG. 2, the better option would be area of interest 110B as the relative storm top image 200 shows the high threat levels 206 for the area of interest 108B, which is invisible on the weather radar display image 100 of FIG. 1.

In some embodiments, the aircraft relative storm top image 200 allows the flight crew to analyze an entire scan area using only one display, as compared to a VSD which shows a single azimuth (e.g., of a range of scan angles) view.

Referring now to FIGS. 3-6, an exemplary embodiment of a system 300 according to the inventive concepts disclosed herein is depicted. In some embodiments, the system may include an aircraft 302, which may include at least one user (e.g., flight crew and/or pilot(s)), at least one display unit computing device 304, at least one aircraft computing device 306, at least one radar computing device 308, and/or at least one user interface 310, some or all of which may be communicatively coupled at any given time. In some embodiments, the at least one display unit computing device 304, the at least one aircraft computing device 306, the at least one radar computing device 308, and/or the at least one user interface 310 may be implemented as a single computing device or any number of computing devices configured to perform (e.g., collectively perform if more than one computing device) any or all of the operations disclosed throughout. For example, the at least one display unit computing device 304, the at least one aircraft computing device 306, the at least one radar computing device 308, and/or the at least one user interface 310 may be installed in the aircraft 302. In some embodiments, the at least one display unit computing device 304, the at least one aircraft computing device 306, the at least one radar computing device 308, the at least one user interface 310, and/or a user (e.g., a remote pilot or remote crewmember) may be located offboard of the aircraft 302, for example, if a given aircraft 302 is a remote piloted aircraft (e.g., an unmanned aerial vehicle (UAV) or a drone aircraft).

Figure 3:
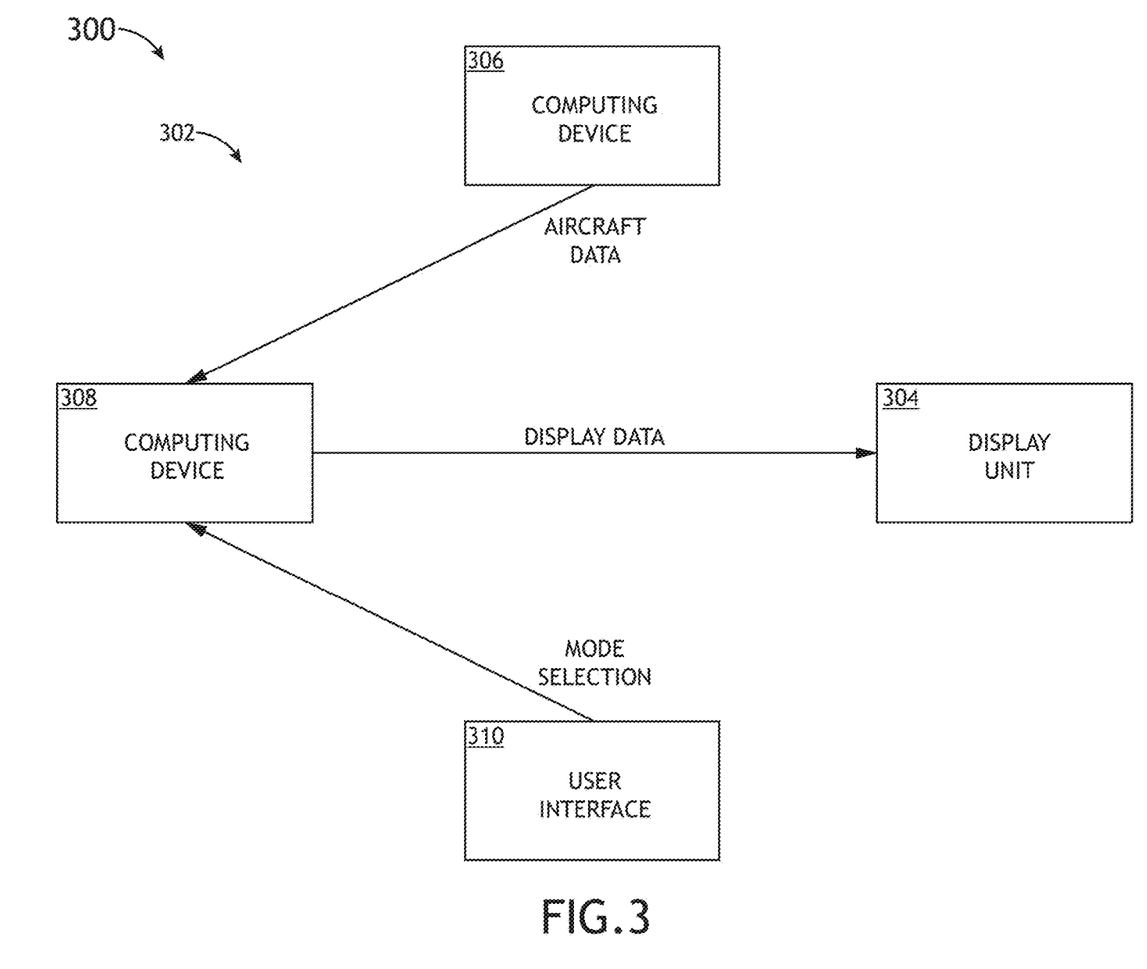
FIG. 3 is a view of an exemplary embodiment of a system according to the inventive concepts disclosed herein.

For example, the user may be a pilot or crew member. The user may interface with the system 300 via the at least one user interface 310. The at least one user interface 310 may be implemented as any suitable user interface, such as a control panel, a touchscreen (e.g., of the display unit computing device 304 and/or another display unit), a multipurpose control panel, a control panel integrated into a flight deck, a cursor control panel (CCP) (sometimes referred to as a display control panel (DCP)), a keyboard, a mouse, a trackpad, at least one hardware button, a switch, an eye tracking system, and/or a voice recognition system. The user interface 310 may be configured to receive at least one user input and to output the at least one user input to a computing device (e.g., 304, 306, and/or 308). For example, a pilot of the aircraft 302 may be able to interface with the user interface 310 to: make a weather radar mode selection indicating whether to display the aircraft relative storm top image 200 and/or a weather display image 100 (e.g., the weather display image 100 lacking a conveyance of the information associated with the difference between at least some of the storm top altitudes and the altitude of the aircraft 302). For example, the weather radar mode selection may indicate to display either or both of the weather display image 100 or the aircraft relative storm top image 200. For example, such user inputs may be output to the radar computing device 308 and/or the display unit computing device 304.

Figure 4:
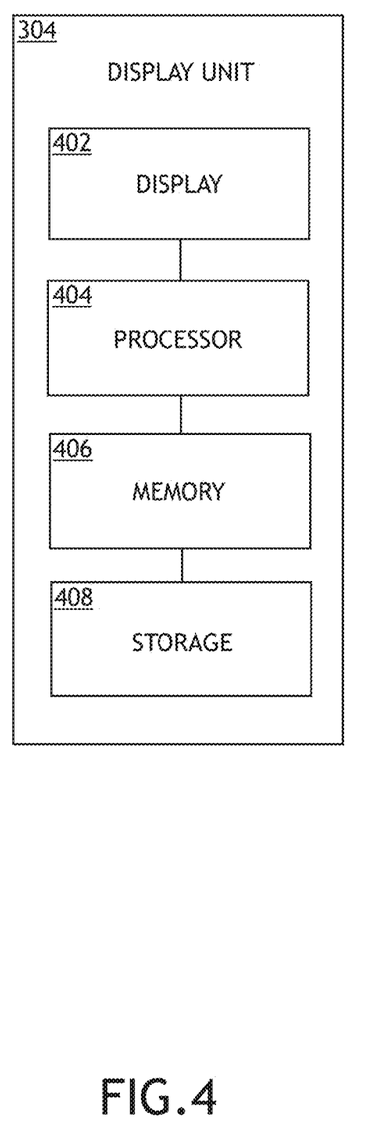
FIG. 4 is a view of an exemplary embodiment of a display unit computing device of the system of FIG. 3 according to the inventive concepts disclosed herein.

The display unit computing device 304 may be implemented as any suitable computing device, such as a primary flight display (PFD) computing device, a weather radar display computing device, and/or a multi-function window (MFW) display computing device. As shown in FIG. 4, the display unit computing device 304 may include at least one display 402, at least one processor 404, at least one memory 406, and/or at least one storage 410, some or all of which may be communicatively coupled at any given time. For example, the at least one processor 404 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 404 may include a CPU and a GPU configured to perform (e.g., collectively perform) any of the operations disclosed throughout. The processor 404 may be configured to run various software applications (e.g., a weather radar display application, a PFD application, and/or an MFW application) or computer code stored (e.g., maintained) in a non-transitory computer-readable medium (e.g., memory 406 and/or storage 410) and configured to execute various instructions or operations. The processor 404 may be configured to perform any or all of the operations disclosed throughout. For example, the processor 404 may be configured to: receive at least one aircraft relative storm top image 200 as graphical data (e.g., from the radar computing device 308) The display 402 may be configured to display the at least one aircraft relative storm top image 200 to a user.

Figure 5:
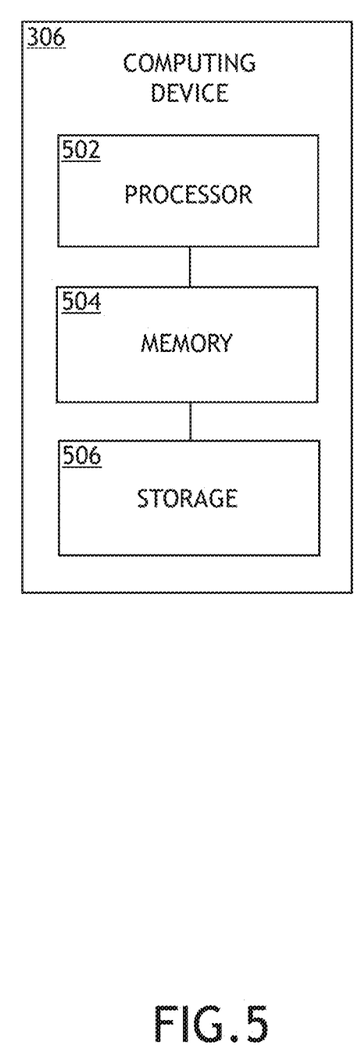
FIG. 5 is a view of an exemplary embodiment of an aircraft computing device of the system of FIG. 3 according to the inventive concepts disclosed herein.

The at least one aircraft computing device 306 may be implemented as any suitable computing device, such as a flight management system (FMS) computing device, a flight data computer, an inertial reference unit (IRU), or a global positioning system (GPS) device. The at least one aircraft computing device 306 may include any or all of the elements, as shown in FIG. 5. For example, the aircraft computing device 306 may include at least one processor 502, at least one memory 504, and/or at least one storage 506, some or all of which may be communicatively coupled at any given time. For example, the at least one processor 502 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 502 may include a CPU and a GPU configured to perform (e.g., collectively perform) any of the operations disclosed throughout. The processor 502 may be configured to run various software applications (e.g., an FMS application, a flight data computer application, an IRU application, and/or a GPS application) or computer code stored (e.g., maintained) in a non-transitory computer-readable medium (e.g., memory 504 and/or storage 506) and configured to execute various instructions or operations. The processor 502 of the aircraft computing device 306 may be configured to perform any or all of the operations disclosed throughout. For example, the processor 502 of the computing device 210A may be configured to: output aircraft data (e.g., information of altitude of the aircraft 302, information of a position of the aircraft 302, information of an air temperature outside of the aircraft 302, FMS data, flight path data, GPS data, inertial reference unit (IRU) data, flight data, and/or flight computer data) to the display unit computing device 304 and/or the radar computing device 308.

The at least one radar computing device 308 may be implemented as any suitable computing device, such as a weather radar computing device. The at least one radar computing device 308 may include any or all of the elements shown in FIG. 6. For example, the radar computing device 308 may include at least one radar antenna 601, at least one processor 602, at least one memory 604, and/or at least one storage 606, some or all of which may be communicatively coupled at any given time. For example, the at least one processor 602 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 602 may include a CPU and a GPU configured to perform (e.g., collectively perform) any of the operations disclosed throughout. The processor 602 may be configured to run various software applications (e.g., a radar application) or computer code stored (e.g., maintained) in a non-transitory computer-readable medium (e.g., memory 604 and/or storage 606) and configured to execute various instructions or operations. The processor 602 of the radar computing device 308 may be configured to perform any or all of the operations disclosed throughout. For example, the processor 602 may be configured to: obtain aircraft data associated with the aircraft 302 (e.g., from the at least one aircraft computing device processor 502); obtain horizontal weather radar scans and vertical weather radar scans for the aircraft 302 (e.g., from the at least one radar antenna 601 or an offboard source (e.g., a ground-based weather data aggregator or air traffic control (ATC))); obtain or generate storm top data (e.g., obtained from an offboard source (e.g., a ground-based weather data aggregator or air traffic control (ATC)) or based at least on the horizontal weather radar scans and the vertical weather radar scans), the storm top data including information associated with storm top altitudes and storm top locations; generate aircraft relative storm top data based at least on a difference between each of the storm top altitudes and an altitude of the aircraft 302 (e.g., based at least on a difference between each of the storm top altitudes and an altitude of the aircraft 302 or based at least on a difference between an altitude of the aircraft 302 and each of the storm top altitudes); generate an aircraft relative storm top image 200 based at least on the aircraft relative storm top data, wherein the aircraft relative storm top image 200 depicts a view of weather in front of the aircraft 302 (e.g., a two-dimensional (2D) overhead view of the weather in front of the aircraft) across a range of scan angles, wherein the aircraft relative storm top image conveys information (e.g., textual information and/or graphical information, such as colors, shading, and/or symbols) associated with the difference between at least some of the storm top altitudes and the altitude of the aircraft 302; and/or output the aircraft relative storm top image 200 as graphical data (e.g., to the display 402).

Figure 6:
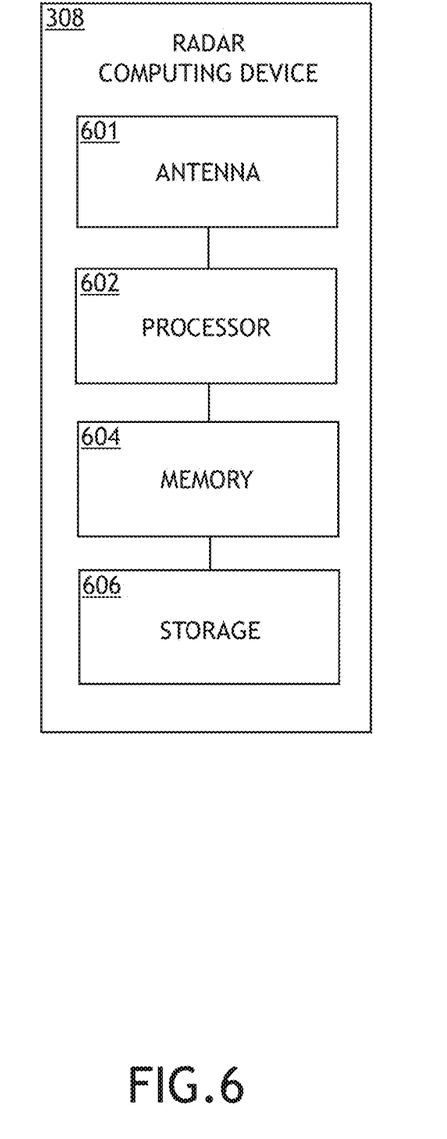
FIG. 6 is a view of an exemplary embodiment of a radar computing device of the system of FIG. 3 according to the inventive concepts disclosed herein.

Additionally, for example, the processor 602 may be configured to: receive a weather radar mode selection indicating whether to display the aircraft relative storm top image 200 and/or a weather display image 100, the weather display image 100 lacking a conveyance of the information associated with the difference between at least some of the storm top altitudes and the altitude of the aircraft 302; and/or based at least on the weather radar mode selection, output the aircraft relative storm top image 200 and/or the weather display image 100 as graphical data to the display 402 for presentation to the user.

Additionally, for example, the aircraft relative storm top image 200 may convey information (e.g., graphical information) associated with the difference between at least some of the storm top altitudes and the altitude of the aircraft 302. For example, the graphical information may be based at least on predetermined threat levels (e.g., 202, 204, and/or 206) associated with the difference between at least some of the storm top altitudes and the altitude of the aircraft 302. For example, each of the predetermined threat levels (e.g., 202, 204, and/or 206) may be color coded. For example, the predetermined threat levels (e.g., 202, 204, and/or 206) may include a low threat level 202 (e.g., color coded as green), a moderate threat level 204 (e.g., color coded as yellow), and a high threat level 206 (e.g., color coded as red). For example, the high threat level 206 may include storm tops having storm top altitudes within 6,000 vertical feet of the altitude of the aircraft 302.

For example, at least one processor (e.g., the at least one processor 404, the at least one processor 502, and/or the at least one processor 602) may be configured to (e.g., collectively configured to, if more than one processor): obtain aircraft data associated with the aircraft 302 (e.g., from the at least one aircraft computing device processor 502); obtain horizontal weather radar scans and vertical weather radar scans for the aircraft 302 (e.g., from the at least one radar antenna 601 or an offboard source (e.g., a ground-based weather data aggregator or air traffic control (ATC))); obtain or generate storm top data (e.g., obtained from an offboard source (e.g., a ground-based weather data aggregator or air traffic control (ATC)) or based at least on the horizontal weather radar scans and the vertical weather radar scans), the storm top data including information associated with storm top altitudes and storm top locations; generate aircraft relative storm top data based at least on a difference between each of the storm top altitudes and an altitude of the aircraft 302; generate an aircraft relative storm top image 200 based at least on the aircraft relative storm top data, wherein the aircraft relative storm top image 200 depicts a view of weather in front of the aircraft 302 across a range of scan angles, wherein the aircraft relative storm top image conveys information associated with the difference between at least some of the storm top altitudes and the altitude of the aircraft 302; and/or output the aircraft relative storm top image 200 as graphical data (e.g., to the display 402).

At least one processor (e.g., the at least one processor 404, the at least one processor 502, and/or the at least one processor 602) of the aircraft 302 may be configured to perform (e.g., collectively perform) any or all of the operations disclosed throughout.

Figure 7:
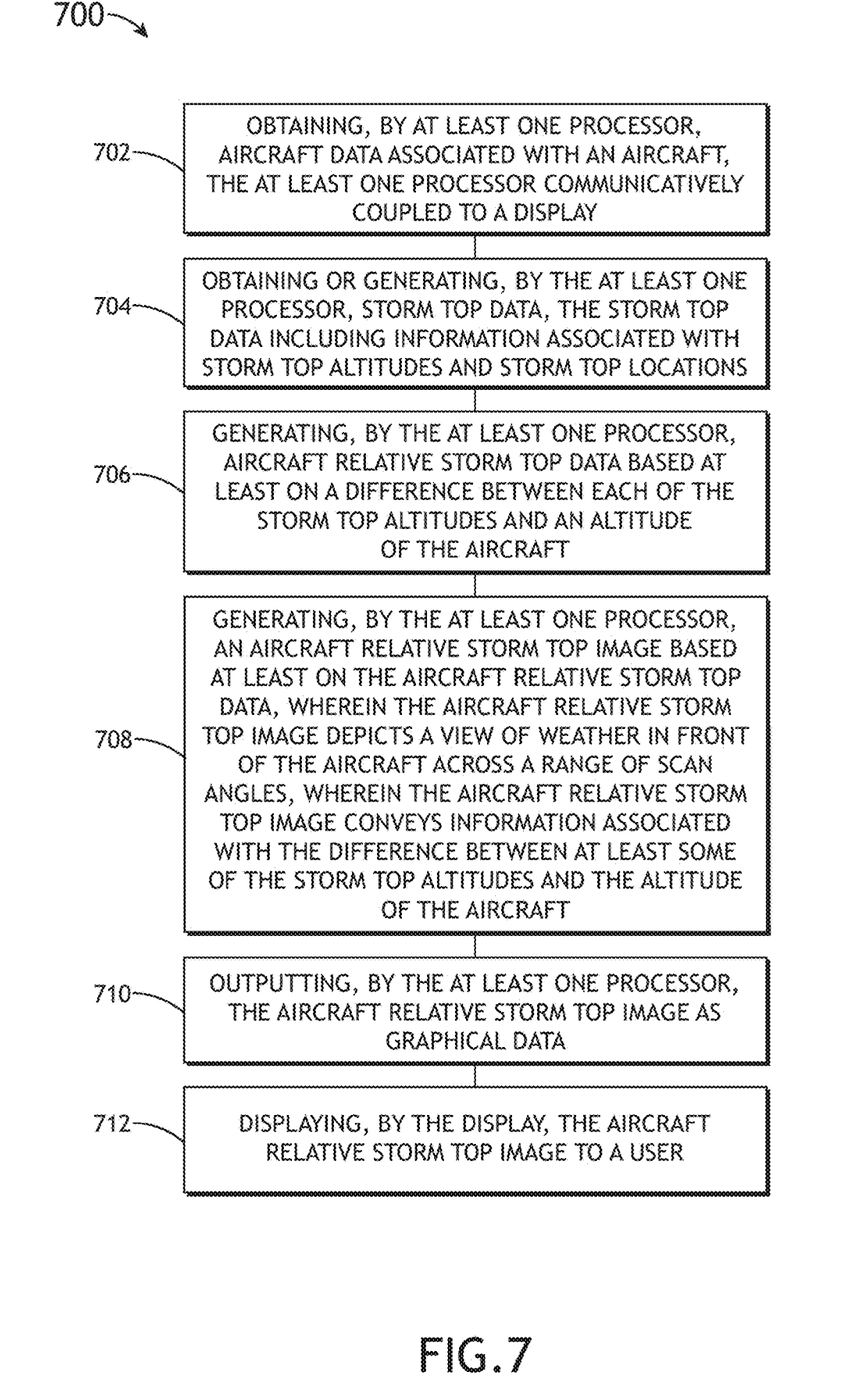
FIG. 7 is a diagram of an exemplary embodiment of a method according to the inventive concepts disclosed herein.

Referring now to FIG. 7, an exemplary embodiment of a method 700 according to the inventive concepts disclosed herein may include one or more of the following steps. Additionally, for example, some embodiments may include performing one or more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include obtaining, by at least one processor, aircraft data associated with an aircraft, the at least one processor communicatively coupled to a display.

A step 704 may include obtaining or generating, by the at least one processor, storm top data, the storm top data including information associated with storm top altitudes and storm top locations.

A step 706 may include generating, by the at least one processor, aircraft relative storm top data based at least on a difference between each of the storm top altitudes and an altitude of the aircraft.

A step 708 may include generating, by the at least one processor, an aircraft relative storm top image based at least on the aircraft relative storm top data, wherein the aircraft relative storm top image depicts a view of weather in front of the aircraft across a range of scan angles, wherein the aircraft relative storm top image conveys information associated with the difference between at least some of the storm top altitudes and the altitude of the aircraft.

A step 710 may include outputting, by the at least one processor, the aircraft relative storm top image as graphical data.

A step 712 may include displaying, by the display, the aircraft relative storm top image to a user.

Further, the method 700 may include any of the operations disclosed throughout.

As will be appreciated from the above, embodiments of the inventive concepts disclosed herein may be directed to a system 300 (e.g., an aircraft system) and a method configured to generate and/or display an aircraft relative storm top image 200. For example, the aircraft relative storm top image 200 may depict a view of weather in front of an aircraft 302 across a range of scan angles. The aircraft relative storm top image 200 may convey information associated with the difference between storm top altitudes and an altitude of the aircraft 302.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
  a display; and
  at least one processor communicatively coupled to the display, the at least one processor configured to:
    obtain aircraft data associated with an aircraft;
    obtain or generate storm top data, the storm top data including information associated with storm top altitudes of storm tops and storm top locations of the storm tops;
    generate aircraft relative storm top data based at least on a difference between each of the storm top altitudes and an altitude of the aircraft;
    generate an aircraft relative storm top image based at least on the aircraft relative storm top data, wherein the aircraft relative storm top image depicts a view of weather in front of the aircraft across a range of scan angles, wherein the view of the weather in front of the aircraft is a two-dimensional (2D) overhead view of the weather in front of the aircraft, wherein the aircraft relative storm top image conveys information associated with the difference between at least some of the storm top altitudes and the altitude of the aircraft, a range dimension, a weather scan angle dimension, and threat levels associated with at least some of the storm tops, wherein each of the threat levels is based on a relative difference between at least some of the storm top altitudes and the altitude of the aircraft, wherein the information is at least one of graphical information or textual information; and
    output the aircraft relative storm top image as graphical data;
  wherein the display is configured to display the aircraft relative storm top image to a user.

2. The system of claim 1, wherein the display is installed in the aircraft, wherein the at least one processor is installed in the aircraft.

3. The system of claim 2, wherein the at least one processor comprises at least one display unit computing device processor and at least one radar computing device processor, the at least one display unit computing device processor and the at least one radar computing device processor being communicatively coupled, wherein the at least one processor is further configured to obtain the aircraft data from at least one aircraft computing device.

4. The system of claim 1, wherein the at least one processor is further configured to: obtain horizontal weather radar scans and vertical weather radar scans for the aircraft; and generate the storm top data based at least on the horizontal weather radar scans and the vertical weather radar scans.

5. The system of claim 1, wherein the information associated with the difference between at least some of the storm top altitudes and the altitude of the aircraft is graphical information, wherein the graphical information is based at least on predetermined threat levels associated with the difference between at least some of the storm top altitudes and the altitude of the aircraft is graphical information.

6. The system of claim 5, wherein each of the predetermined threat levels is color coded.

7. The system of claim 6, wherein the predetermined threat levels include a low threat level, a moderate threat level, and a high threat level.

8. The system of claim 7, wherein the low threat level is color coded as green, the moderate threat level is color coded as yellow, and the high threat level is color coded as red.

9. The system of claim 8, wherein the high threat level includes storm tops having storm top altitudes within 6,000 vertical feet of the altitude of the aircraft.

10. The system of claim 1, wherein the user is located offboard of the aircraft.

11. The system of claim 1, wherein the at least one processor is further configured to receive a weather radar mode selection indicating whether to display the aircraft relative storm top image or a weather display image, the weather display image lacking a conveyance of the information associated with the difference between at least some of the storm top altitudes and the altitude of the aircraft.

12. The system of claim 11, wherein the weather radar mode selection indicates to display the weather display image, wherein the at least one processor is further configured to, based at least on the weather radar mode selection, output the weather display image as graphical data to the display for presentation to the user.

13. The system of claim 1, wherein the storm top image based at least on the aircraft relative storm top data, wherein the aircraft relative storm top image consists of the view of weather in front of the aircraft across the range of scan angles, wherein the aircraft relative storm top image consists of the information associated with the difference between at least some of the storm top altitudes and the altitude of the aircraft, the range dimension, the weather scan angle dimension, and the threat levels associated with at least some of the storm tops, wherein each of the threat levels is based on the relative difference between the at least some of the storm top altitudes and the altitude of the aircraft wherein the information is at least one of the graphical information or the textual information.

14. The system of claim 1, wherein the aircraft data includes information of the altitude and at least one of a position of the aircraft or an air temperature outside of the aircraft.

15. A method, comprising:
obtaining, by at least one processor, aircraft data associated with an aircraft, the at least one processor communicatively coupled to a display;
obtaining or generating, by the at least one processor, storm top data, the storm top data including information associated with storm top altitudes of storm tops and storm top locations of the storm tops;
generating, by the at least one processor, aircraft relative storm top data based at least on a difference between each of the storm top altitudes and an altitude of the aircraft;
generating, by the at least one processor, an aircraft relative storm top image based at least on the aircraft relative storm top data, wherein the aircraft relative storm top image depicts a view of weather in front of the aircraft across a range of scan angles, wherein the view of the weather in front of the aircraft is a two-dimensional (2D) overhead view of the weather in front of the aircraft, wherein the aircraft relative storm top image conveys information associated with the difference between at least some of the storm top altitudes and the altitude of the aircraft, a range dimension, a weather scan angle dimension, and threat levels associated with at least some of the storm tops, wherein each of the threat levels is based on a relative difference between at least some of the storm top altitudes and the altitude of the aircraft, wherein the information is at least one of graphical information or textual information;
outputting, by the at least one processor, the aircraft relative storm top image as graphical data; and
displaying, by the display, the aircraft relative storm top image to a user.

16. The method of claim 15, wherein the storm top image based at least on the aircraft relative storm top data, wherein the aircraft relative storm top image consists of the view of weather in front of the aircraft across the range of scan angles, wherein the aircraft relative storm top image consists of the information associated with the difference between at least some of the storm top altitudes and the altitude of the aircraft, the range dimension, the weather scan angle dimension, and the threat levels associated with at least some of the storm tops, wherein each of the threat levels is based on the relative difference between the at least some of the storm top altitudes and the altitude of the aircraft wherein the information is at least one of the graphical information or the textual information.

\* \* \* \* \*